United States Patent [19]

Herbsthofer et al.

[11] 3,739,709

[45] June 19, 1973

[54] BEVERAGE BREWER

[75] Inventors: Franz L. Herbsthofer, Wilmette; Harvey R. Karlen, Chicago; Herbert E. Wagner, Tinley Park, all of Ill.

[73] Assignee: Cory Corporation, Chicago, Ill.

[22] Filed: Jan. 20, 1971

[21] Appl. No.: 107,903

[52] U.S. Cl. .............................................. 99/289
[51] Int. Cl. .......................................... A47j 31/00
[58] Field of Search .................... 99/275, 289, 288, 99/299, 300, 302

[56] References Cited
UNITED STATES PATENTS

| 3,446,137 | 5/1969 | Pryor | 99/289 |
| 2,802,599 | 8/1957 | Callahan | 99/289 |
| 3,218,175 | 11/1965 | Siegel | 99/289 |

Primary Examiner—Robert W. Jenkins
Attorney—Hofgren, Wegner, Allen, Stellman & McCord

[57] ABSTRACT

Apparatus for brewing beverage from readily soluble powdered beverage material, such as freeze-dried coffee. Provisions are incorporated for maintaining suitable areas of the system dry to preclude caking and the like to assure maintenance-free controlled brewing operation of the apparatus. Means are provided for effecting improved mixing of the powdered beverage concurrent with the beverage liquid in a mixing chamber. These means may also define a portion of the means for maintaining a portion of the system dry. Delivery of the pulverulent, or powdered, beverage material is controlled by improved valve structure including means for cutting the particulate material at the edges of the opening controlled by the valve means, thereby to preclude incomplete termination of the delivery of the powdered beverage material.

22 Claims, 9 Drawing Figures

Patented June 19, 1973

Inventors:-
Franz L. Herbsthofer,
Harvey R. Karlen
Herbert E. Wagner,
By Hofgren, Wegner, Allen,
Stellman & McCord Attys.

BEVERAGE BREWER

BACKGROUND OF THE INVENTION

1. Field of the Invention

This invention relates to beverage brewing apparatus and in particular to apparatus for brewing beverage from readily soluble powdered beverage ingredients.

2. Description of the Prior Art

In the conventional coffee brewers, ground coffee is delivered to suitable brewing cartridges, or chambers, where the coffee infusion is produced by means of subjecting the ground coffee to hot water for a preselected period of time suitable to extract the coffee oils. With the advent of improved powdered coffee materials, such as freeze-dried coffee, it is possible to produce a cup of coffee without resort to the conventional brewing operation by simply mixing a preselected quantity of the powdered coffee with a suitable quantity of hot water. Apparatuses for providing coffee from such powdered ingredients have been developed but have had serious disadvantages due to the lack of satisfactorily controlling the powdered coffee ingredients in the apparatus.

SUMMARY OF THE INVENTION

The present invention comprehends an improved beverage forming and dispensing apparatus for use with readily soluble powdered beverage materials, such as freeze-dried coffee, which eliminates the disadvantages of the available known apparatuses of this type in a novel and simple manner. The present apparatus is extremely economical of construction while yet providing the highly desirable features discussed below.

More specifically, the invention comprehends providing such a beverage forming and dispensing apparatus utilizing means for maintaining the powdered coffee, or other beverage ingredient, dry during storage as well as in the means for delivering the powdered coffee to a mixing chamber wherein the dry powdered coffee is mixed with a suitable quantity of hot water or other suitable beverage forming liquid to form the desired beverage. The apparatus may include a hot water tank for maintaining a supply of hot water suitable to form the beverage and waste heat employed in maintaining the water in the tank hot may be utilized for maintaining desired portions of the system dry. For this purpose, air moving means may be employed for circulating air from adjacent the hot water tank to the different portions of the apparatus requiring such maintained dry conditions.

Radiant energy means may be provided adjacent selected portions of the apparatus for providing heat thereto further maintaining these portions dry. In one form, the radiant energy means comprises incandescent lamp means which may be also utilized for transmission of light through one or more light transmitting portions of the housing of the apparatus such as for use in advertising or the like.

Still further, means may be provided for withdrawing air from the mixing chamber and circumjacent space to remove moisture therefrom resulting from a previous mixing of beverage therein. Such means may further withdraw air from substantially the entire space within the outer housing of the apparatus so as to effectively maintain substantially the entire system relatively dry by eliminating moisture from all parts thereof.

The means for delivering hot air to adjacent the mixing chamber may be arranged to direct the hot air directly into the means for guiding the powdered material from the storage means to the mixing chamber. Thus, the forceful delivery of hot air further serves as a means for forcibly urging the delivered powdered material into the mixing chamber for improved mixture with the liquid therein.

The radiant energy means may be disposed outwardly of the powdered beverage material storage means and may be disposed adjacent the delivery means as well as the mixing chamber so as to provide additional drying effect thereat.

The delivery of dry powdered beverage material from the storage means may be controlled by an improved valve arranged to cut across the flow path of the beverage material from the storage means. The valve may comprise a blade-type valve having a relatively sharp leading edge adapted to cut the powdered material at the edge of the passage so as to effectively assure termination of the delivery of the powdered material notwithstanding the disposition of some powdered material on the surface of the passage means and/or blade.

The apparatus may be made to be substantially fully automatic. Thus, with the improved maintenance free operation provided by the maintained dry condition of the system, an improved beverage forming and dispensing apparatus is obtained.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 3:
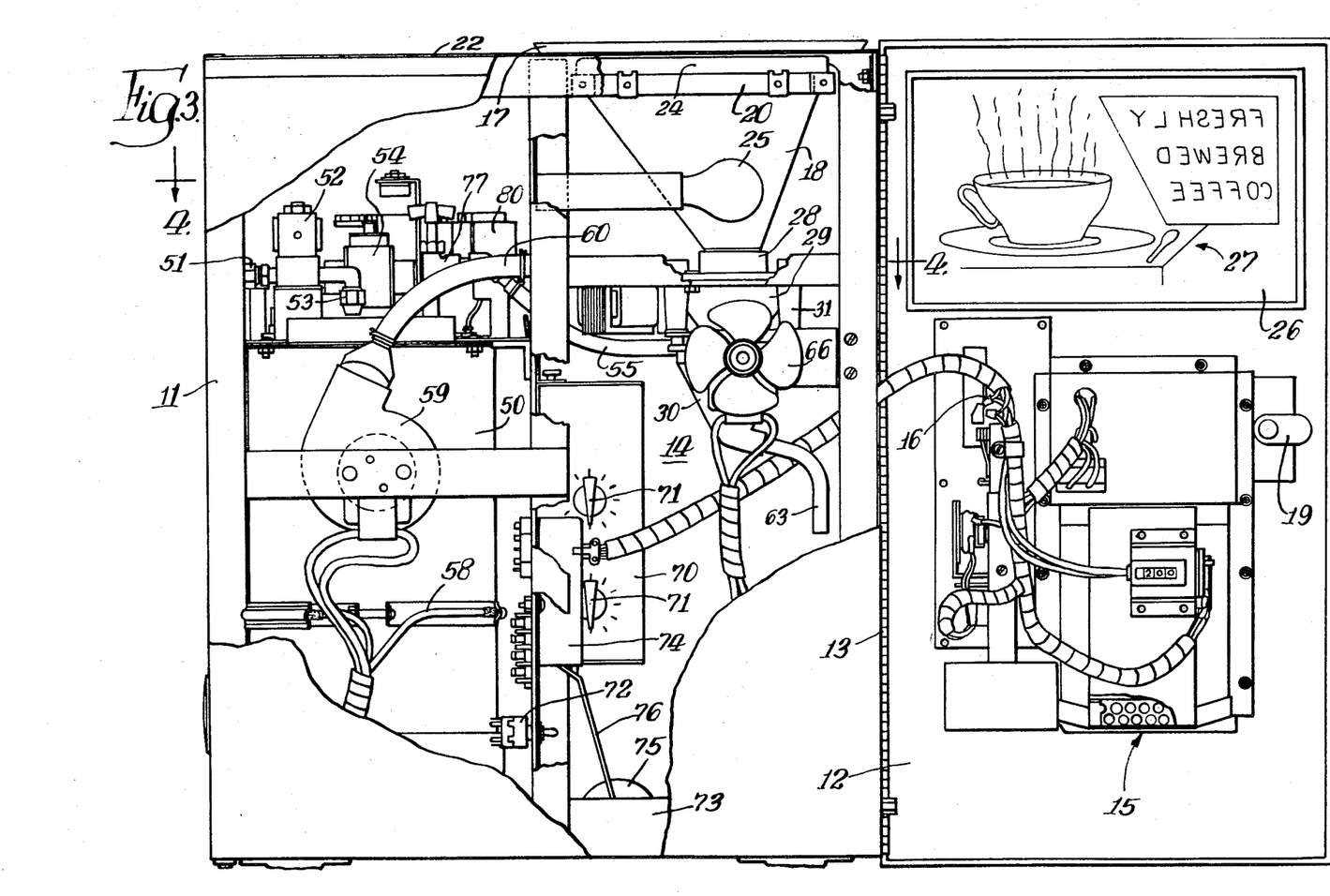
FIG. 3 is an enlarged vertical section taken substantially along the line 3—3 of FIG. 1.

In the exemplary embodiment of the invention as shown in the drawing, a beverage forming and dispensing apparatus generally designated 10 is provided for dispensing cups of beverage such as hot coffee. The apparatus includes an enclosure 11 housing the apparatus and having a front door 12 mounted on a suitable hinge 13 for forwardly exposing the internal space 14 for access to the enclosed apparatus as best seen in FIG. 3. The front door includes a cup-dispensing mechanism generally designated 15 of well known conventional construction requiring no further disclosures here. The coffee is automatically delivered into a dispensed cup in mechanism 15 such as under the control of the insertion of a suitable coin into a coin-receiving mechanism 16 associated with the control 15. Operation of the apparatus to provide a cup of coffee and insertion of a coin into mechanism 16 causes a mixing of a preselected quantity of readily soluble powdered coffee material such as freeze-dried coffee with a suitable quantity of hot water in a mixing chamber, and the subsequent delivery of the coffee beverage to the cup in mechanism 15. Housing 11 includes an upper cover 17 providing access to a storing means, such as hopper 18 into which the powdered beverage material is placed. The front door may be selectively locked by a suitable keyed lock 19 for providing controlled access to the apparatus in space 14. The apparatus may be connected to a suitable source of water under pressure (not shown) for providing the brewing liquid.

Figure 4:
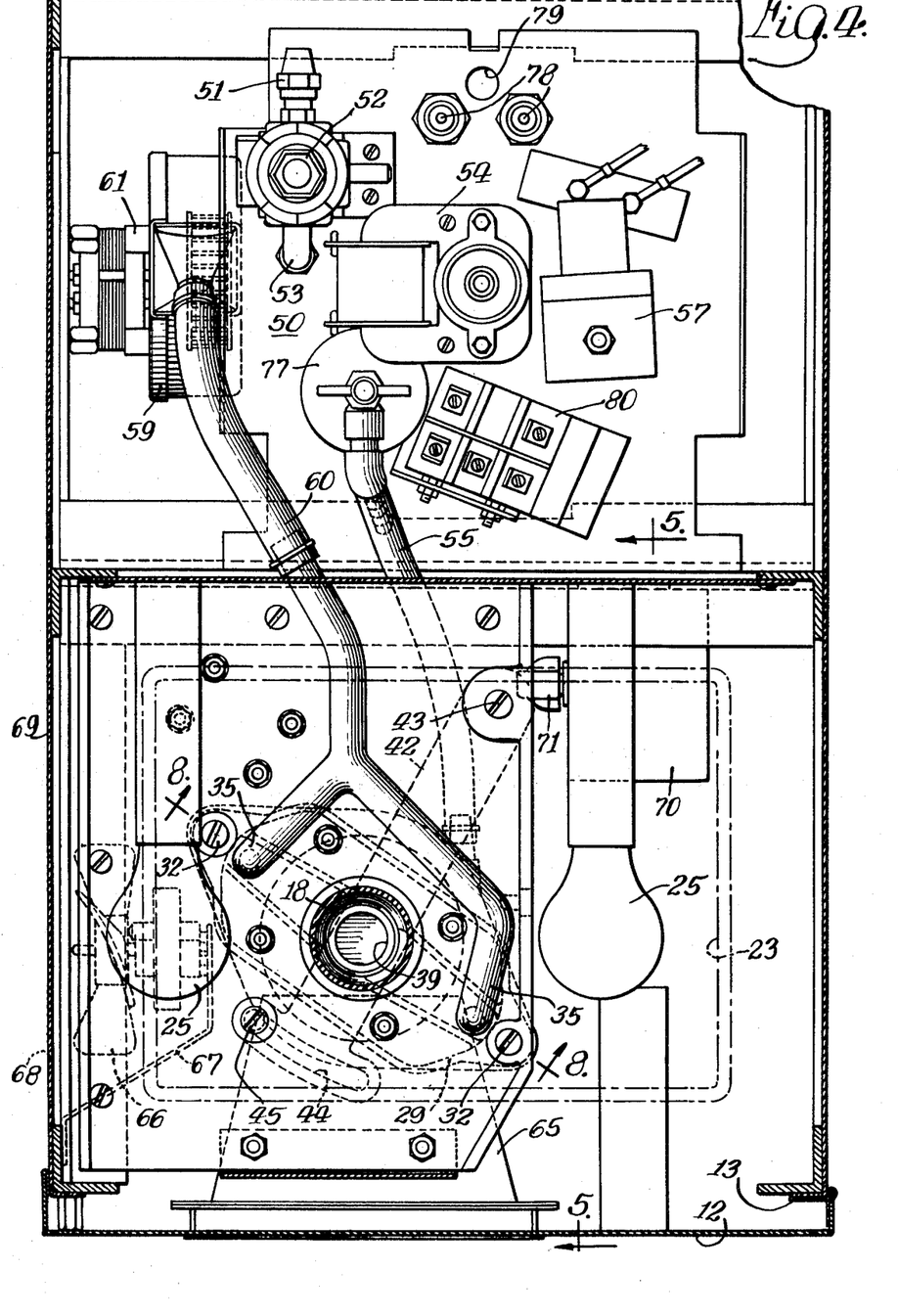
FIG. 4 is a further enlarged horizontal section taken substantially along the lines 4—4 of FIG. 3.
Figures 5, 6:
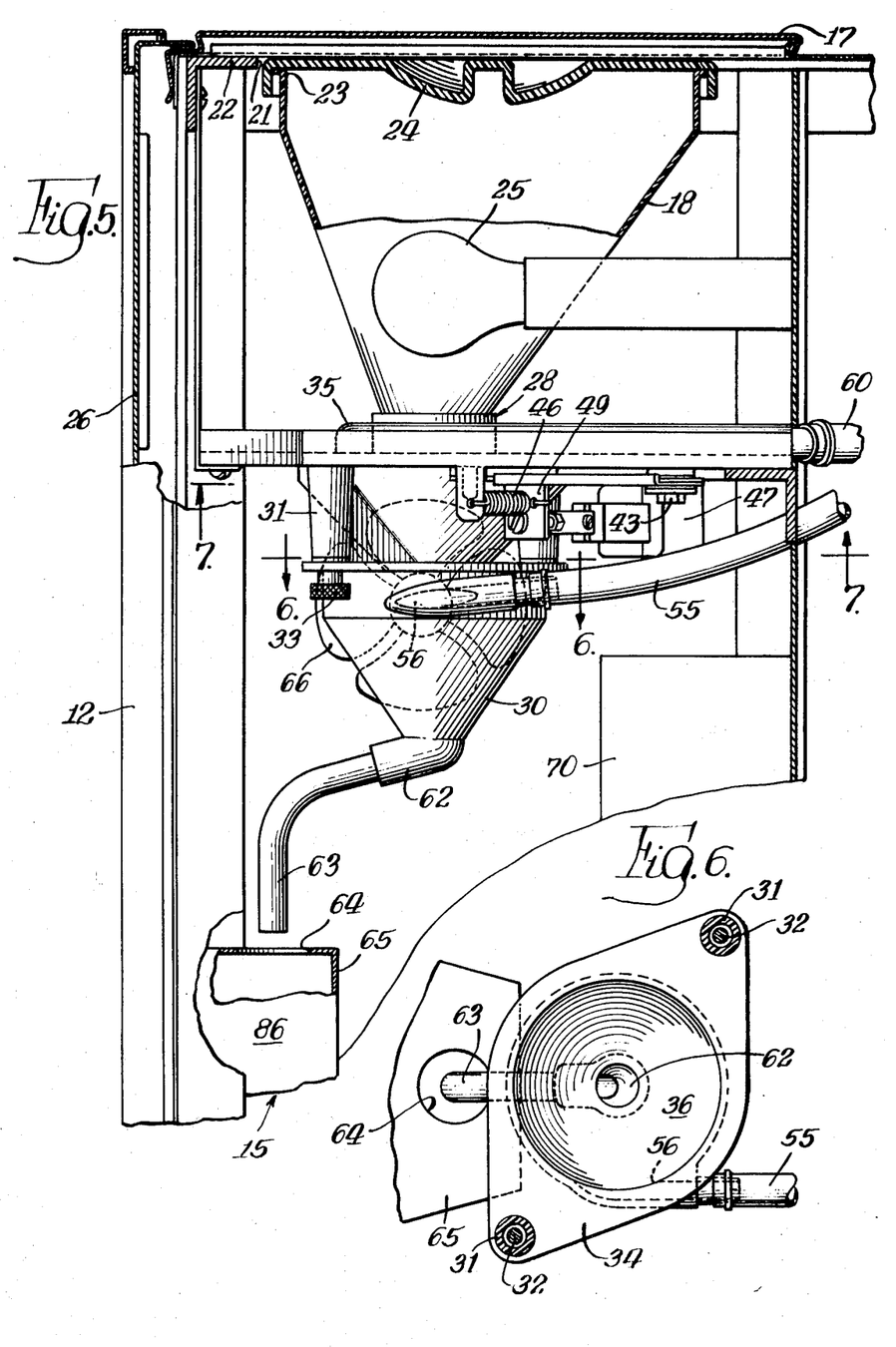
FIG. 5 is a fragmentary vertical section taken substantially along the line 5—5 of FIG. 4.
FIG. 6 is a fragmentary horizontal section taken substantially along the line 6—6 of FIG. 5.
Figure 8:
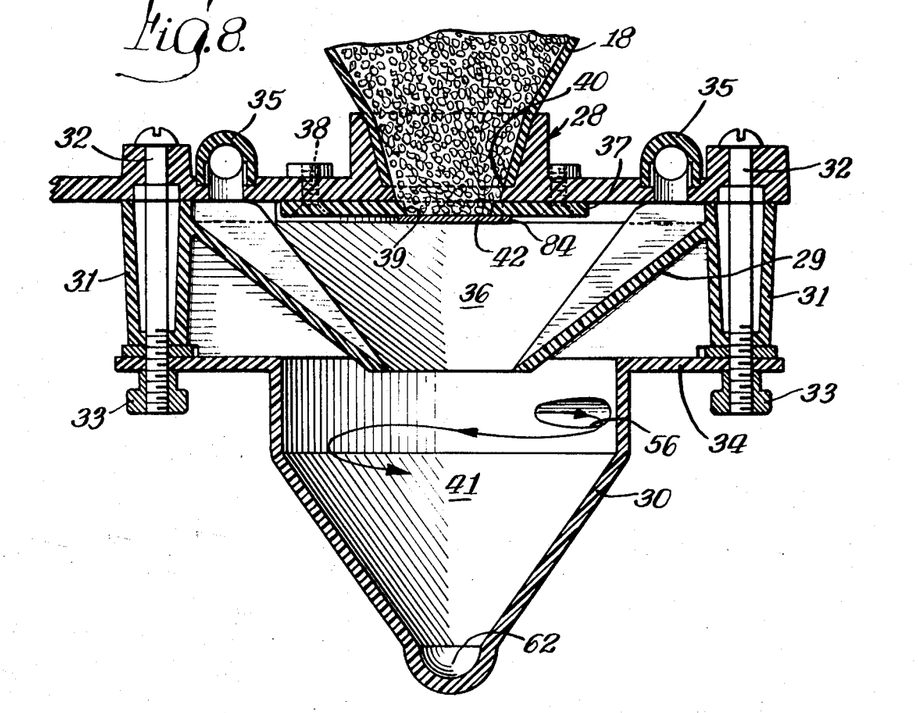
FIG. 8 is a fragmentary vertical section taken substantially along the line 8—8 of FIG. 4.

Hopper 18 is carried on a suitable bracket 20 subjacent an opening 21 in the top wall 22 of housing 11. As best seen in FIG. 5, the hopper comprises an upwardly widening receptacle having a top portion 23 effectively sealing closed by a cover 24 for minimizing entry of moisture into the hopper to minimize caking and the like of the stored powdered coffee. To further maintain the powdered coffee dry in hopper 18, a pair of radiant energy devices, herein illustratively comprising lamps 25, are provided at opposite sides of the hopper, as best seen in FIG. 4. As shown in FIG. 3, door 12 includes a light-transmitting, herein translucent, portion 26 which may be provided with suitable indicia 27 such as advertising material, which is illuminated by lamps 25 to provide an improved aesthetically desirable effect. The lower end of the hopper is received in a plastic support 28 which is provided with a depending guide 29 for delivering the powdered coffee to a further subjacent mixing chamber means 30. As shown in FIG. 8, mixing chamber means 30 may be secured to the support 28 by means of depending legs 31 on support 28 and suitable bolts 32 and nuts 33 cooperating with an outturned flange portion 34 of the mixing chamber means. Support 28 further includes a pair of hot air inlets 35 for delivering the air into the downwardly narrowing delivery passage 36 of guide 29. A slide plate 37 is secured to the support 28 by suitable means, such as screws 38 at the upper end of space 36, and is provided with a central opening 39 aligned with the bottom opening 40 of hopper 18 for permitting gravitational downward flow of the powdered beverage material from the hopper through guide space 36 into the mixing chamber 41 of mixing chamber means 30. Downward delivery of the powdered material is controlled by blade-type valve 42 extending normally across the bottom of opening 39 in the closed position of the valve, as shown in FIG. 8.

Figure 7:
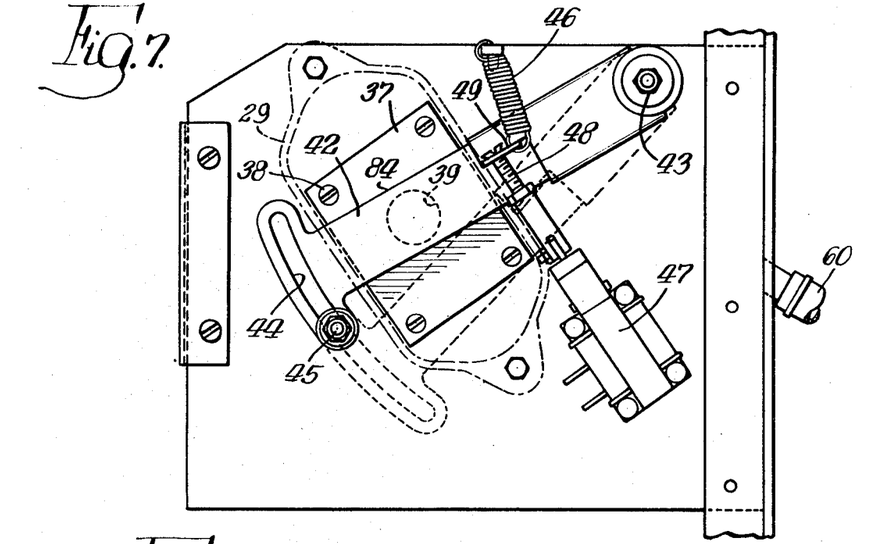
FIG. 7 is a fragmentary horizontal section taken substantially along the line 7—7 of FIG. 5.

As best seen in FIG. 7, blade 42 comprises an elongated element having one end swingably mounted on a pivot 43 and having its distal end provided with a transverse slot 44 slidably engaging a fixed guide pin 45 for controlling the limit of swinging of the blade. The blade is biased in a clockwise direction, as seen in FIG. 7, by a suitable coil spring 46 and is moved against the biasing action of spring 46 to open opening 39 by a suitable conventional electric solenoid 47 having its operating member 48 connected to an upstanding connecting portion 49 on the blade element 42. As discussed briefly above, hot water is delivered to the mixing chamber 41 from a suitable hot water tank 50. Cold water may be delivered to the tank through an inlet 51 connected to a suitable control valve 52 controlling the delivery through an inlet conduit 53 to tank 50. The hot water is delivered from the tank by means of a pump 54 and a transfer conduit 55 provided with an opening 56 to the upper portion of mixing chamber 41, as shown in FIG. 8. The water is delivered tangentially to the chamber so as to provide a swirling mixing action for improved dissolving of the powdered coffee material in the water in the mixing chamber. A suitable level control 57 may be provided for causing the level of water in tank 50 to be restored to the full level whenever the level drops a preselected amount, such as corresponding to the level of a small quantity of hot water, such as 3 cupsful, from the tank. Thus, the tank is maintained substantially full at all times while yet the water is not replaced upon the delivery of each individual cup of coffee from the apparatus. The water in tank 50 is heated by suitable conventional heating means such as band heater 58.

In so heating the water in tank 50, some waste heat is produced adjacent the tank. The invention comprehends utilizing the waste heat for maintaining different portions of the system dry for improved powdered coffee brewing and dispensing. For this purpose, an air moving means, herein a blower 59, is provided adjacent tank 50 as shown in FIGS. 3 and 4 for delivering the heated air from adjacent the tank through a suitable duct to the hot air supplies 35 to guide 29, as shown in FIG. 8. Blower 59, which may be operated by a suitable conventional motor 61, is operated so as to cause a forcible delivery of the heated air downwardly through delivery passage 36 thereby causing an improved downward delivery of the powdered coffee into the mixing chamber 41 for improved rapid forming of the coffee beverage. As two inlets 35 are provided, some countercurrent flow of the air is effected, further improving the mixing operation.

As shown in FIG. 5, the lower end of the mixing chamber means 30 is provided with an outlet 62 to which a conduit 63 is connected for delivering the mixed coffee downwardly through an opening 64 in the housing 65 of mechanism 15 for providing a cup of freshly brewed coffee.

Air from the entire space 14 within housing 11 is continuously exhausted by means of an air moving means, herein comprising a fan 66 carried on the housing by a suitable bracket 67 for discharging the air from space 14 outwardly through an opening 68 in the left sidewall 69 of the housing.

Referring now to FIGS. 3 and 4, the preparation and delivery of the coffee is controlled by a sequence timer 70 having suitable manually adjustable controls 71. A master control switch 72 is provided subjacent the timer for providing an overall control of the apparatus. Dispensing mechanism 15 is arranged to permit spillage and the like to pass downwardly into a tray 73 for maintaining sanitary conditions in the dispenser. To preclude undesirable overflow of the tray, an overflow control switch 74 is provided having a float operator 75 carried by an arm 76 for operation thereof as a function of the level of overflow liquid in tray 73 whereby all operation of the apparatus is terminated when the level reaches a preselected full level.

A flow control valve 77 may be provided for controlling the delivery of water through transfer conduit 55. A pair of heating elements 78 are provided for controlling the temperature of the water in tank 50 and an access opening 79 may be provided, as shown in FIG. 4. Control of the heating of the water in tank 50 by band heater 58 is effected by a dual switch thermostat 80.

Figure 9:
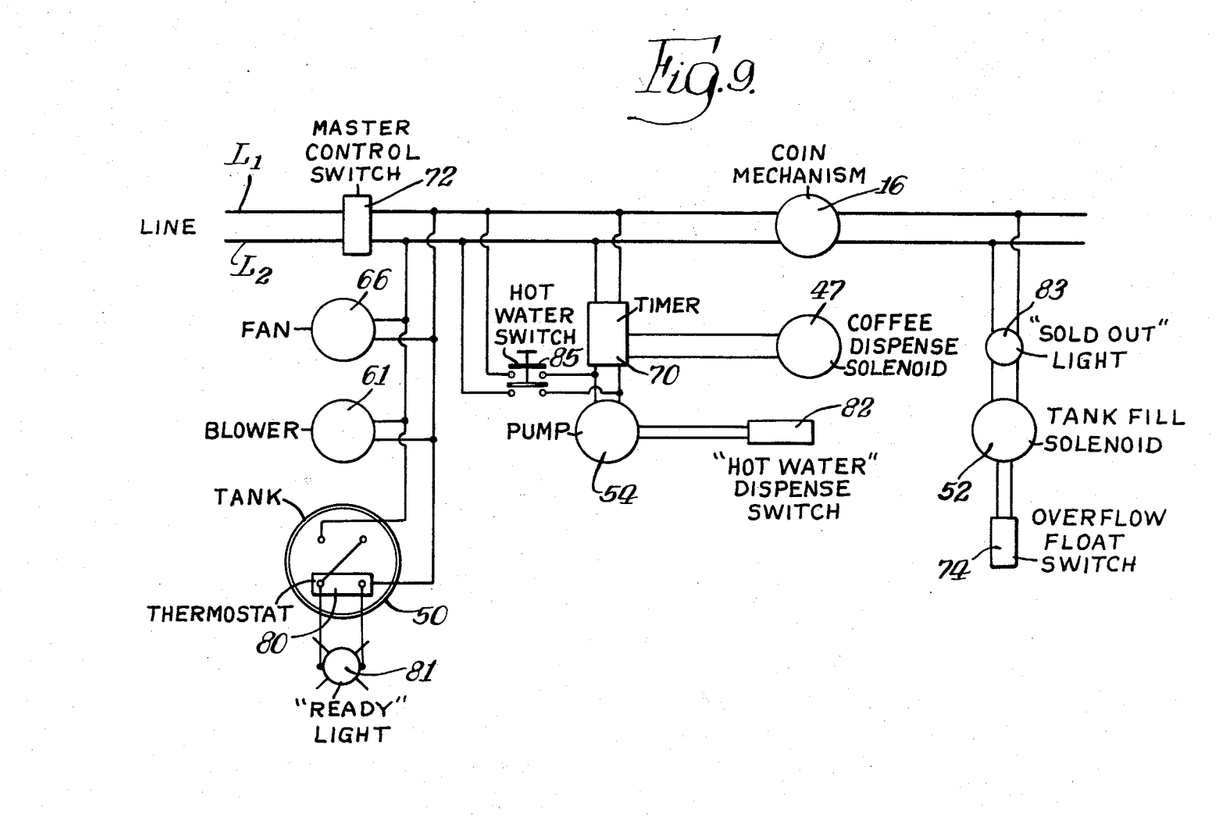
FIG. 9 is a schematic electrical diagram illustrating the operation of the apparatus.

The operation of the beverage forming dispensing apparatus 10 is extremely simple. As shown in FIG. 9, the device may be operated from a suitable conventional power supply line including power supply leads L1 and L2. Power is supplied through master control switch 72 for operating the fan 66, blower motor 61, and heating elements 78 in tank 50 under the control of thermostat 80. As shown in FIG. 8, a lamp 81 may be provided in parallel with thermostat 80 to indicate the ready condition of the apparatus.

Coffee dispense solenoid 47 is operated by timer 70 to provide a preselected quantity of powdered coffee to the mixing chamber as discussed above. Pump 54 is operated under the control of hot water dispense switch 82 and timer 70 to provide the desired quantity of hot water to the mixing chamber. Operation of the device is controlled by coin receiving mechanism 16, further controlling a "Sold-Out" light 83, the tank fill solenoid 52 and the overflow control switch 74.

Thus, upon introduction of a suitable coin into mechanism 16, apparatus 10 functions to operate pump 54 thereby to provide approximately one cup of water to mixing chamber 41 through opening 56. A preselected time after the water flow is commenced, such as one to two seconds, timer 70 causes operation of valve blade solenoid 47 to open hopper discharge opening 39 and permit powdered coffee to drop downwardly through the space 36 defined by shroud 29. After a preselected time, such as from one-twentieth to one second, the timer deenergizes solenoid 47 permitting spring 46 to urge the blade 42 back to the hopper closing position of FIG. 7. The leading edge 84 of blade 42 is squared so as to define a cutting edge movable across the undersurface of slide plate 37 to cut cleanly any powdered coffee which may become disposed between the edge 84 and the edge of slide plate 37 defining opening 39 thereby to assure complete closing of the hopper. Any powdered material so cut drops down into the water in mixing chamber 41 which is continued to be delivered to the hopper subsequent to the closing of the hopper valve. Falling movement of the powdered coffee downwardly through space 36 is augmented by the flow of air from inlets 35 to assure delivery of all of the powdered coffee so following from hopper 18 into the water being delivered into chamber 41. The continuous movement of heated dry air at this time over the surfaces defining space 36 effectively precludes collection of powdered coffee thereon. Further, the downward air movement effectively prevents moisture from moving upwardly from mixing chamber 41 into space 36, further assuring maintained freedom of collection of powdered material on the surfaces of space 36. The forceful delivery of the powdered beverage material combined with the swirling action of the hot water resulting from the tangential delivery thereof from opening 56 into chamber 41 assures a thorough substantially instantaneous mixing of the powdered coffee with the hot water for improved preparation of the coffee beverage. Any moisture which tends to remain in the system, such as in mixing chamber 41, subsequent to the preparation of a quantity of water is quickly and effectively removed by fan 66 which removes moisture from all portions of apparatus space 14 continuously through vent 68.

Figure 1:
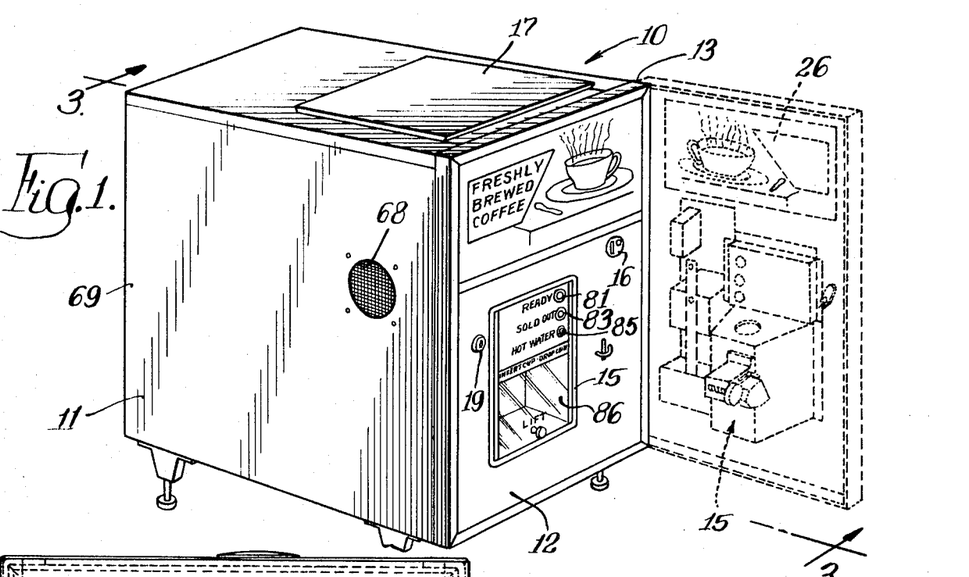
FIG. 1 is a perspective view of a beverage forming and dispensing apparatus embodying the invention.
Figure 2:
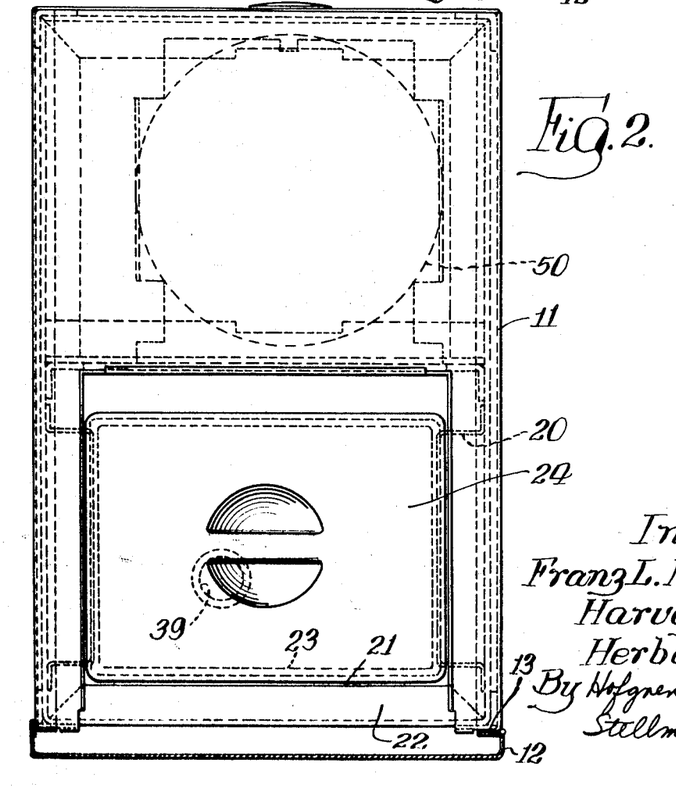
FIG. 2 is a plan view thereof with the upper cover removed.

As shown in FIG. 1, mechanism 15 may include "Ready" indicator 81 and "Sold-Out" indicator 83 for facilitated determination of the condition of the apparatus by the user. Should the user wish to obtain a cup of hot water rather than a cup of coffee, he may operate pushbutton 85, also provided on mechanism 15, which pushbutton effects a corresponding operation of pump 54 suitably to provide the desired quantity of hot water without operating the coffee dispensing solenoid 47 as illustrated in FIG. 9. Thus, the user may selectively obtain coffee by inserting the cup in the cup space 86 shown in FIG. 1 and depositing a coin in mechanism 16 whereupon an automatic delivery of a cup of fresh brewed coffee is provided; or, he may obtain a cup of hot water by simply placing the cup in space 86 and operating pushbutton 85.

By virtue of the maintained dry condition of apparatus 10, the dried beverage material may be stored for extended periods of time without caking or undesirably deteriorating. The maintenance of the mixing and guide structures relatively dry further assures improved sanitation and maintenance free operation of the apparatus notwithstanding the handling of the relatively highly soluble beverage brewing materials. The use of lamps 25 in combination with the air moving means of apparatus 10 provides improved drying action by virtue of the radiation energy thereof acting on hopper 18, guide 29, and mixing chamber means 30, as well as the valve mechanism for controlling the delivery of the powdered beverage ingredients to the mixing chamber.

The foregoing disclosure of specific embodiments is illustrative of the broad inventive concepts comprehended by the invention.

We claim:

1. In a beverage forming and dispensing apparatus having means for storing readily soluble, powdered beverage material, means defining a mixing chamber, means for delivering a preselected quantity of dry powdered beverage material to said mixing chamber from said storing means, means for delivering a preselected quantity of suitable liquid to said mixing chamber for mixing of said powdered beverage material therewith to form a liquid beverage in said chamber, and means for dispensing liquid from said mixing chamber, means for maintaining said powdered beverage material dry during storage in said storing means comprising means for causing a flow of air away from said storing means and said mixing chamber adapted to preclude undesirable moistening of said beverage material in said storing means by moisture in the apparatus.

2. The beverage forming and dispensing apparatus of claim 1 wherein said means for maintaining said powdered beverage material dry comprises means constantly providing heat to said storing means.

3. The beverage forming and dispensing apparatus of claim 1 wherein said means for maintaining said powdered beverage material dry comprises radiant energy means constantly providing heat to said storing means.

4. The beverage forming and dispensing apparatus of claim 1 wherein said means for maintaining said powdered beverage material dry comprises incandescent lamp means adjacent said storing means constantly providing heat to said storing means.

5. In a beverage forming and dispensing apparatus having means for storing readily soluble, powdered beverage material, means defining a mixing chamber, means for delivering a preselected quantity of powdered beverage material to said mixing chamber from said storing means, means for delivering a preselected quantity of suitable liquid to said mixing chamber for mixing of said powdered beverage material therewith to form a liquid beverage in said chamber, and means for dispensing liquid from said mixing chamber, means for maintaining said means for delivering said powdered beverage material dry comprising means for causing an air flow against and away from said delivering means and said mixing chamber to preclude undesirable clogging of said delivering means by moistening of the beverage material therein by moisture in the apparatus.

6. The beverage forming and dispensing apparatus of claim 5 wherein said means for maintaining said means for delivering said powdered beverage material dry comprises means for directing hot air against said delivery means during delivery of liquid to said mixing chamber.

7. The beverage forming and dispensing apparatus of claim 5 further including means for heating said liquid prior to delivery to said mixing chamber and means for directing air heated by thermal transfer associating with said liquid heating means against said means for maintaining said means for delivering said powdered beverage material dry during delivery of liquid to said mixing chamber.

8. The beverage forming and dispensing apparatus of claim 5 wherein said means for maintaining said means for delivering said powdered beverage material dry comprises radiant energy means disposed adjacent said means for delivering said powdered beverage material.

9. The beverage forming and dispensing apparatus of claim 5 including an enclosure housing said apparatus and including a light transmitting portion, and said means for maintaining said means for delivering said powdered beverage material dry comprises electric lamp means disposed adjacent said means for delivering said powdered beverage material and arranged to pass light outwardly through said light transmitting portion of said enclosure.

10. A beverage forming and dispensing apparatus comprising: means comprising: means for storing readily soluble, powdered beverage material; means defining a mixing chamber; means for delivering a preselected quantity of powdered beverage material to said mixing chamber from said storing means; means for maintaining said means for delivering said powdered beverage material dry; means for delivering a preselected quantity of suitable liquid to said mixing chamber for mixing of said powdered beverage material therewith to form a liquid beverage in said chamber; and means for dispensing liquid from said mixing chamber, said means for maintaining said means for delivering said powdered beverage material dry comprising means for directing hot air against said delivery means during delivery of liquid to said mixing chamber and against the powdered beverage material as it is being delivered to said mixing chamber to cause said powdered beverage material to mix vigorously with the liquid in said mixing chamber.

11. In a beverage forming and dispensing apparatus having means for storing readily soluble powdered beverage material, means defining a mixing chamber, means for delivering a preselected quantity of powdered beverage material to said mixing chamber from said storing means, means for delivering a preselected quantity of suitable liquid to said mixing chamber for mixing of said powdered beverage material therewith to form a liquid beverage in said chamber, means for dispensing liquid from said mixing chamber, and an enclosure housing said apparatus continuously operating means for removing moisture from within said housing to effectively maintain the space therein dry.

12. The beverage forming and dispensing apparatus of claim 11 wherein said moisture removing means comprises air moving means for flowing air outwardly from said space.

13. The beverage forming and dispensing apparatus of claim 11 wherein said moisture removing means comprises air moving means carried by said enclosure for flowing air outwardly from said space.

14. In a beverage forming and dispensing apparatus having means for storing readily soluble, powdered beverage material, means defining a mixing chamber, means for delivering a preselected quantity of powdered beverage material to said mixing chamber from said storing means including valve means for controlling the quantity so delivered, means for delivering a preselected quantity of suitable liquid to said mixing chamber for mixing of said powdered beverage material therewith to form a liquid beverage in said chamber, means for dispensing liquid from said mixing chamber, and means for flowing moisture removing air against said valve means for maintaining the valve means dry notwithstanding communication between said valve means and said mixing chamber afforded by said delivering means.

15. The beverage forming and dispensing apparatus of claim 14 wherein tank means are provided for storing liquid to be delivered to said mixing chamber, and control means are provided for causing refilling of said tank means after a preselected small plurality of said preselected quantities of liquid are delivered therefrom by said delivery means.

16. A beverage forming and dispensing apparatus comprising: means for storing readily soluble, powdered beverage material; means defining a mixing chamber; means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said mixing chamber, said means for delivering a preselected quantity of powdered beverage material to said mixing chamber including means for delaying opening of said valve means until a preselected time after delivery of the liquid to said mixing chamber is commenced.

17. A beverage forming and dispensing apparatus comprising: means for storing readily soluble, powdered beverage material; means defining a mixing chamber; means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said chamber, said valve means comprising means defining a passage for flow of said powdered beverage means, blade means extending transversely to said passage, and means for causing said blade means selectively to move across said passage to terminate sharply flow of powdered beverage material therethrough and to move laterally of said passage to open said passage for a preselected period of time to deliver said preselected quantity of powdered beverage material to said mixing chamber.

18. The beverage forming and dispensing apparatus of claim 17 wherein said blade means has a cutting leading edge for cutting the powdered beverage material at the edges of the passage to preclude incomplete closing of the passage when the blade means is moved to terminate said flow.

19. A beverage forming and dispensing apparatus comprising: means for storing readily soluble, powdered beverage material; means defining a mixing chamber; means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said mixing chamber, said valve means comprising a pivoted blade selectively swingable flatwise across said passage.

20. A beverage forming and dispensing apparatus comprising: means for storing readily soluble, powdered beverage material; means defining a mixing chamber; means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said mixing chamber, said valve means comprising a blade movable across one end of said passage.

21. A beverage forming and dispensing apparatus comprising: means for storing readily soluble, powdered beverage material; means defining a mixing chamber; means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said mixing chamber, said valve means comprising a blade movable across one end of said passage; and means for directing hot air adjacent said blade for maintaining the blade dry.

22. A beverage forming and dispensing apparatus comprising: means for storing readily soluble, powdered beverage material; means defining a mixing chamber, means for delivering a preselected quantity of powdered beverage material to said mixing chamber from said storing means including valve means for controlling the quantity so delivered; means for delivering a preselected quantity of suitable liquid to said mixing chamber for mixing of said powdered beverage material therewith to form a liquid beverage in said chamber; and means for dispensing liquid from said mixing chamber, said passage opening vertically downwardly whereby flow of powdered beverage material therethrough is gravitational; and means for urging said powdered beverage material forcefully from said passage to said mixing chamber and for maintaining said valve means and said delivery means dry.

* * * * *